Aug. 20, 1968   G. H. BARNEY   3,397,676
EXPERIMENTAL ANIMAL CAGE
Filed Sept. 20, 1966
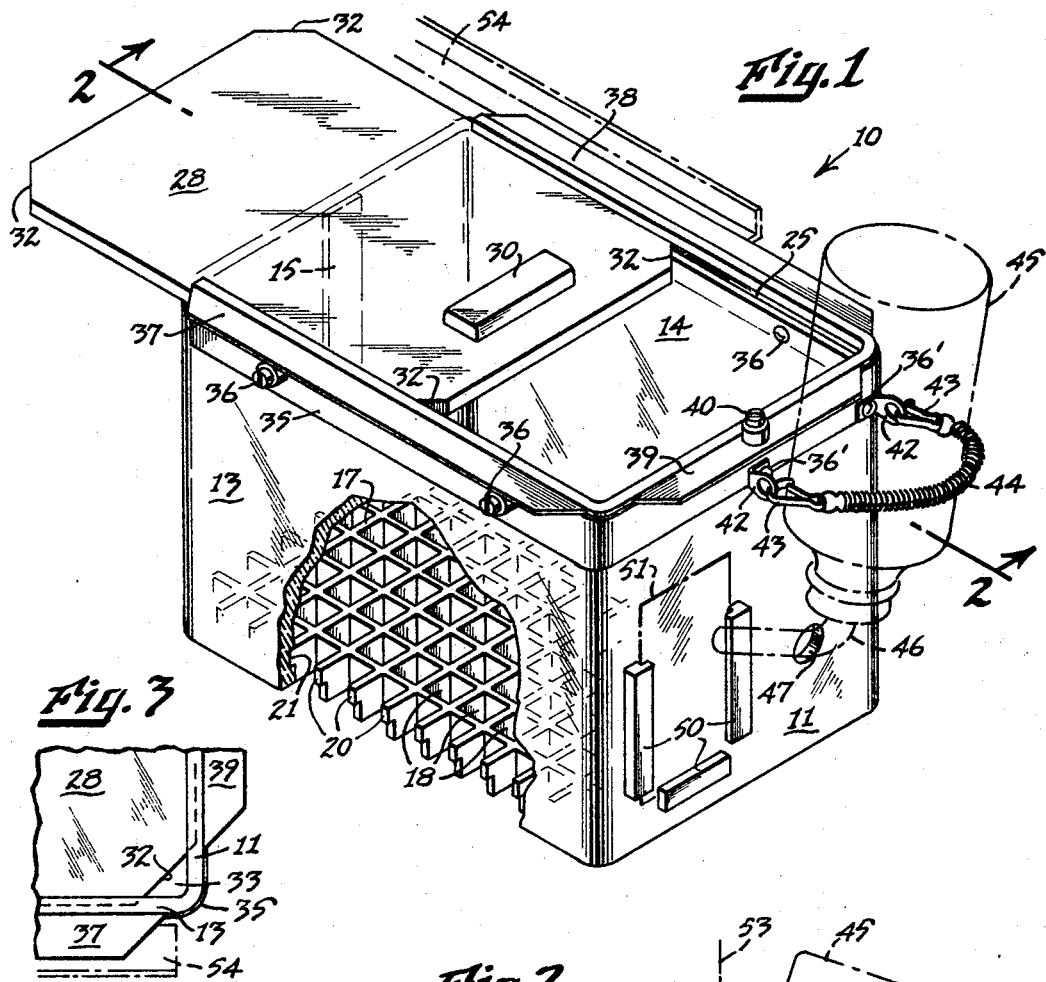
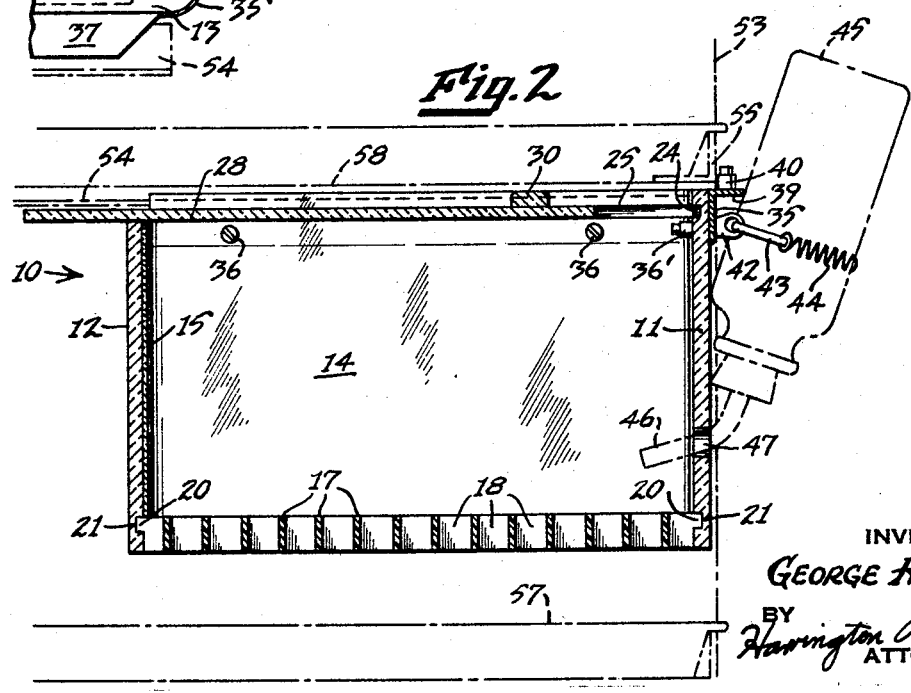
INVENTOR:
GEORGE H. BARNEY
BY
Harrington A. Lackey
ATTORNEY

United States Patent Office 3,397,676
Patented Aug. 20, 1968

3,397,676
EXPERIMENTAL ANIMAL CAGE
George H. Barney, 4038 Albert Drive,
Nashville, Tenn. 37204
Filed Sept. 20, 1966, Ser. No. 580,709
10 Claims. (Cl. 119—15)

This invention relates to a rodent cage, and more particularly to a rodent cage especially designed to minimize the metallic environment for an experimental animal, such as a rodent.

Heretofore, cages for experimental animals, such as rodents, have been made entirely or partially of metal. Event those rodent cages which are made primarily of plastic usually include some form of metal exposed to the animal on the interior of the cage, or include ventilation structure which permits air containing mineral or metallic dust particles to gravitate into the interior of the cage. Such cages are disadvantageous for certain animal experiments, such as investigations of the mineral metabolism of the animal in nutritional experiments, into which metal from the metallic parts of cages or from the air may be introduced in unknown and unwanted quantities. In cages having metal parts, rodents often introduce small bits of metal into their diets by gnawing. The animal might also receive unknown metal or mineral quantities from food in a metal container, placed on a metal floor or over which metal contaminated air has passed.

It is therefore an object of this invention to provide a rodent cage which has a completely non-metallic interior and which includes a ventilating construction for minimizing the gravitation of metallic and mineral particles from the air into the interior of the cage.

Another object of this invention is to provide a rodent cage providing a minimal metallic environment and which is adapted to be mounted in a conventional rodent stand without modifying the construction of the stand.

Another object of this invention is to provide a rodent cage having a minimal metallic environment which is completely interchangeable with conventional metallic rodent cages.

A further object of this invention is to provide a rodent cage for establishing minimal metallic environment in which the bottom wall is constructed to provide substantially the entire ventilation of the cage, to efficiently eliminate the excreta of the rodent, and to provide substantial support for the rodent.

A further object of this invention is to provide a rodent cage designed for minimal metallic environment having a top cover and side walls of impermeable material with minimum ventilation to prevent air impurities, dust and other foreign elements from gravitating into the interior of the cage.

Further objects and advantages of the invention will be apparent from the following description taken in conjunction with the drawings, wherein:

FIG. 1 is a perspective view of the rodent cage made in accordance with this invention, with parts broken away and with the cover panel in a partially open position, and disclosing parts of the rodent stand in phantom;

FIG. 2 is a section taken along the line 2—2 of FIG. 1 showing parts of the rodent stand in phantom; and FIG. 3 is an enlarged fragmentary plan view of the left front corner of the rodent cage.

Referring now to the drawings in more detail, the rodent cage 10 made in accordance with this invention comprises a housing, preferably in the shape of a rectangular parallelepiped, having a front wall 11, a rear wall 12 and opposite side walls 13 and 14. As disclosed in the drawings, the walls 11, 12, 13 and 14 are made from a single continuous wall member of transparent acrylic resin, such as "Plexiglas," the ends of which are bonded together in the middle of the rear wall 13 by means of a "Plexiglas" sealing strip 15 and an adhesive. The front wall 11 and side walls 13 and 14 are of equal height, but the top of rear wall 12 is slightly lower than the tops of the walls 11, 13 and 14, as best disclosed in FIG. 2.

The bottom wall or floor 17 in the cage 10 is preferably a rectangular grid member having longitudinal and transverse slats forming vertically extending openings 18 of uniform size and uniform spacing. The openings 18 are large enough to permit the free passage of the excreta or feces of the rodent therethrough, yet small enough to support the rodents' feet without slipping into the openings 18. The ends of the longitudinal and transverse grid slats are notched to form projecting tongues 20 of uniform height and which are received in the longitudinal grooves 21 spaced at a uniform height from the bottom edges of each of the walls 11, 12, 13 and 14. These tongues 20 are fitted in the corresponding groove 21 before the rear wall 12 is connected by the sealing strip 15, so that the floor 17 is permanently fitted within the cage 10. The height of the floor grid 17 is sufficient to provide adequate strength for supporting the rodent in the cage 10, and may be made of any non-metallic material, such as Styrene plastic.

The square openings 18 not only permit the downward passage of excreta from the cage 10, but also provide for substantially the entire ventilating requirements of the cage 10.

Formed in the inside of the front wall 11 is an elongated tarnsverse groove 24, and communicating with the ends of the groove 24 and formed in the opposite side walls 13 and 14 are a pair of side grooves 25, only the right side groove being shown in the drawings. The grooves 24 and 25 are disposed in a plane below and parallel to the top edges of the walls 11, 13 and 14, but the bottom edges of the grooves 24 and 25 are substantially coplanar, or very slightly above the top edge of the rear wall 12. The heights of the grooves 24 and 25 are uniform, and the opposed side grooves 25 are adapted to slidably receive the side edges of a top cover panel 28. Because of the location of the grooves 24 and 25, the bottom surface of the panel 28 is adapted to slide over the top edge of the rear wall 12, as best disclosed in FIG. 2. However, when the cover panel 28 is in closed position, the front edge of the panel 28 will fit within the front transverse groove 24, which also limits the forward movement of the cover panel 28. The cover panel 28 is also made of a transparent acrylic resin, such as "Plexiglas," and preferably of the same material as the side walls 11, 12, 13 and 14.

A handle member, such as the transverse handle bar 30, is fixed to the top surface of the cover panel 28 in order to move the cover panel 28 to its various closed and opened positions. The height of the handle 30 is not greater than the distance between the top surface of the panel 28 and the plane containing the top edges of the front wall 11 and side walls 13 and 14.

Although the cover panel 28 is made of a solid imperforate material, such as "Plexiglas," to prevent any air or dust particles from entering the cage 10 through the open top, nevertheless, a minimal amount of ventilation through the top is permitted by beveling each corner 32 of the cover panel 28. As best disclosed in FIG. 3, when the cover panel 28 is in closed position, beveled corner 32 provides a small vent opening 33 between the corner 32 and the walls of the cage 10, such as the front wall 11 and side wall 13. Moreover, the openings 33 are located adjacent the corners of the cage 10 so that any slight amounts of dust or metallic particles gravitating through the vents 33 may continue down the corners of the walls and out through the bottom corner openings 18 in the floor 17, and are not likely to gravitate into the middle of the cage where the animal and its food may be located.

Extending around three sides of the cage 10, specifically the outsides of the side wall 13, front wall 11 and side wall 14, is a reinforcing band or strap 35, preferably made of metal such as stainless steel, and secured to the corresponding "Plexiglas" walls by non-metallic fasteners, such as polyethylene screws 36.

Projecting outwardly and laterally from the band 35 secured to the side walls 13 and 14, are elongated parallel runners 37 and 38. Projecting from the front portion of the band 35 against the front wall 11 is a flange 39 supporting a solid cylindrical stop member 40, which projects above the plane of the top edges of the side walls 13 and 14 and the front wall 11, as disclosed in FIG. 2. The stop member 40 is preferably made of a tough plastic, such as polyethylene.

If desired, a pair of eyelets 42 may be secured to the polyethylene screws 36' securing the front portion of the band 35 to the front wall 11. These eyelets 42 are adapted to receive snap hooks 43 at the opposite ends of a resilient bottle retaining band 44, disclosed as a coil spring in FIGS. 1 and 2. Thus, a water bottle 45 may be inserted between the resilient retaining band 44 and the cage 10 in an inverted position with the flexible feeding spout 46 extending through the feed hole 47 of the front wall 11.

A label holder, such as 50, disclosed in FIG. 1, constructed of notched receiving blocks for containing a label 51 may be fixed to the front wall 11, also, if desired.

In mounting the rodent cage 10 within a conventional rodent stand 53, the runners 37 and 38 are placed upon the corresponding opposed stationary tracks 54 in the rodent stand, and the cage 10 is thrust rearwardly until the stop member 40 abuts against the front transverse frame member 55. The cylindrical stop member 40 is so located that when it abuts the transverse member 55, the cage 10 is properly located within the stand 53, and is also limited against further rearward movement.

In its mounted position in the rodent stand 53, the floor 17 of the cage 10 is spaced a predetermined distance above the excreta tray 57, a conventional part of the stand 53, and so located to receive the excreta discharged from the interior of the cage 10 through the square openings 18.

The next higher excreta tray 58 in stand 53 is spaced very close to the top of the cage 10 when mounted in the stand 53. Consequently, because of the proximity of the upper tray 58 to the cage 10, the handle 30 should not project above the top edges of the walls 11, 13 and 14.

By either completely removing the cage 10 from the stand 53, or by withdrawing it partially to a position relative to the tracks 54, as disclosed in FIG. 1, and then manually pushing the cover panel 28 toward the rear to a position such as that disclosed in FIG. 1, the interior of the cage 10 is accessible to the laboratory technician or other operator of the cage 10. In this connection, it will be noted that it is a considerable advantage to construct the cage so that the panel 28 may be moved rearwardly to open the top of the cage 10, and forwardly to close the cage. If the panel 28 were constructed to move forwardly instead of rearwardly, the entire length of the panel 28 would be between the operator and the opening in the rear portion of the cage 10. Moreover, the cage 10 would have to be almost completely, if not completely, removed from the stand 53 in order for the interior of the cage to be accessible if the panel 28 were movable forward for opening.

Moreover, having the cover panel 28 movable rearwardly only, as opposed to being movable forwardly and rearwardly, also provides means for not only positively closing the cover, but also to indicate to the operator when the cover is closed, that is, when the front edge of the panel 28 is secured within the front groove 24.

By having an impermeable cover panel 28, not only is the gravitation of foreign particles into the cage 10 eliminated when the panel 28 is closed, but also when the cage 10 is mounted in the stand 53, the closed panel 28 will prevent the rodent from reaching up and gnawing upon the metallic bottom of the excreta tray 58.

It will be noted from the drawings and the above description, that the entire interior of the cage 10 is made from non-metallic materials, and moreover, any accessory parts, such as the screws 36, which extend into the interior of the cage 10, are also non-metallic. As a matter of fact, in this particular construction, the only metal parts are the reinforcing band 35, the flanges 37, 38 and 39, the eyelets 42, snaps 43 and retaining band 44, all of which parts are entirely on the outside of the cage 10. Moreover, the metallic parts of the sand 53, such as the excreta trays 57 and 58 and the transverse frame member 55 are not only outside of, but shielded from the interior of, the cage 10.

Because of the simplicity of construction and materials employed, the cage 10 may be easily cleaned with warm water at 50–60° C. and a mild household detergent.

As previously mentioned, the rodent cage 10 is completely interchangeable with a conventional metallic rodent cage adapted for and normally received in the conventional rodent stand 53. Moreover, the rodent cage 10 is so constructed in shape and dimension, that no modifications are necessary in the structure of the rodent stand 53.

Because of the location of the stop member 40 substantially midway between the sides of the cage 10 and because of its cylindrical and resilient structure, the stop member 40 is adapted to withstand repeated impacts of the sliding movement of the cage 10 upon the tracks 54 by the transverse frame 55 with a minimum of fatigue. This is a considerable improvement over the right-angle, metal flange structures now employed as stop members, which have a high rate of fracture and fatigue.

It will be apparent to those skilled in the art that various changes may be made in the invention without departing from the spirit and scope thereof, and therefore the invention is not limited by that which is shown in the drawings and described in the specification.

What is claimed is:
1. A rodent cage comprising:
 (a) a housing for receiving a rodent having an endless, solid side wall member of non-metallic material, a bottom wall of non-metallic material and an open top;
 (b) said bottom wall having a plurality of vertically extending openings therethrough, uniformly spaced and of a uniform size large enough to permit the free passage of the rodent's excreta, and small enough to support the feet of the rodent,
 (c) a solid, impermeable cover panel of non-metallic material adapted to close said open top; and
 (d) elongated, parallel runners fixed to opposite outsides of said housing for slidably engaging tracks on a rodent stand to suspend said housing in the rodent stand.
2. The invention according to claim 1 comprising means on said side walls to slidably receive said cover panel for opening and closing said open top.
3. The invention according to claim 2 in which at least one edge portion of said panel is spaced from said side wall in closed position to provide a vent opening communicating with the interior of said housing.
4. The invention according to claim 1 in which said housing is a rectangular parallelepiped in which said side wall member comprises a front wall, a rear wall and a pair of opposed side walls, said cover panel is rectangular and said runners are fixed on the outsides of said opposite side walls.
5. The invention according to claim 4 further comprising means on the insides of said side walls for slid- ably receiving the side edges of said cover panel, and the height of said rear wall being slightly less than the height of said front wall, so that said cover panel is slidable rearwardly over said rear wall in open position and adapted to abut against said front wall in closed position.

6. The invention according to claim 4 in which at least one of the corners of said rectangular cover panel is beveled, to provide a vent opening into the interior of said housing when said cover panel is closed.

7. The invention according to claim 5 further comprising a cylindrical stop member fixed to said front wall to project upwardly above said housing and adapted to abut against a transverse frame member on said rodent stand to limit the movement of said rodent cage in said rodent stand.

8. The invention according to claim 4 in which said bottom wall comprises a rectangular grid member having uniform square openings.

9. The invention according to claim 4 in which said front, rear and side walls and said cover panel are transparent.

10. The invention according to claim 5 in which said front wall and side walls are of equal height and in which said top panel is mounted for slidable movement in a plane spaced below the plane containing the top edges of said front and side walls, and further comprising a handle member on top of said cover panel and wholly contained within the space between said top panel and the plane containing said top edges.

References Cited
UNITED STATES PATENTS

| | | | |
|---|---|---|---|
| 2,467,525 | 4/1949 | Fricke | 119—15 |
| 2,988,044 | 6/1961 | Adelberg et al. | 119—15 |
| 3,074,375 | 1/1963 | Finkel | 119—18 |
| 3,212,474 | 10/1965 | Higgins et al. | 119—18 |
| 3,213,828 | 10/1965 | Sorensen | 119—20 |
| 3,225,738 | 12/1965 | Palencia | 119—17 |
| 3,238,922 | 3/1966 | Trexler | 119—15 |
| 3,283,745 | 11/1966 | Vittetoe | 119—28 |
| 3,304,913 | 2/1967 | Nesher | 119—15 |
| 3,343,520 | 9/1967 | Schwarz | 119—15 |
| 3,367,308 | 2/1968 | Quattrone et al. | 119—15 |

ALDRICH F. MEDBERY, *Primary Examiner.*